June 2, 1964   L. G. SIMJIAN   3,135,828
APPARATUS FOR PROVIDING SOLID REPRODUCTIONS
Filed April 20, 1962
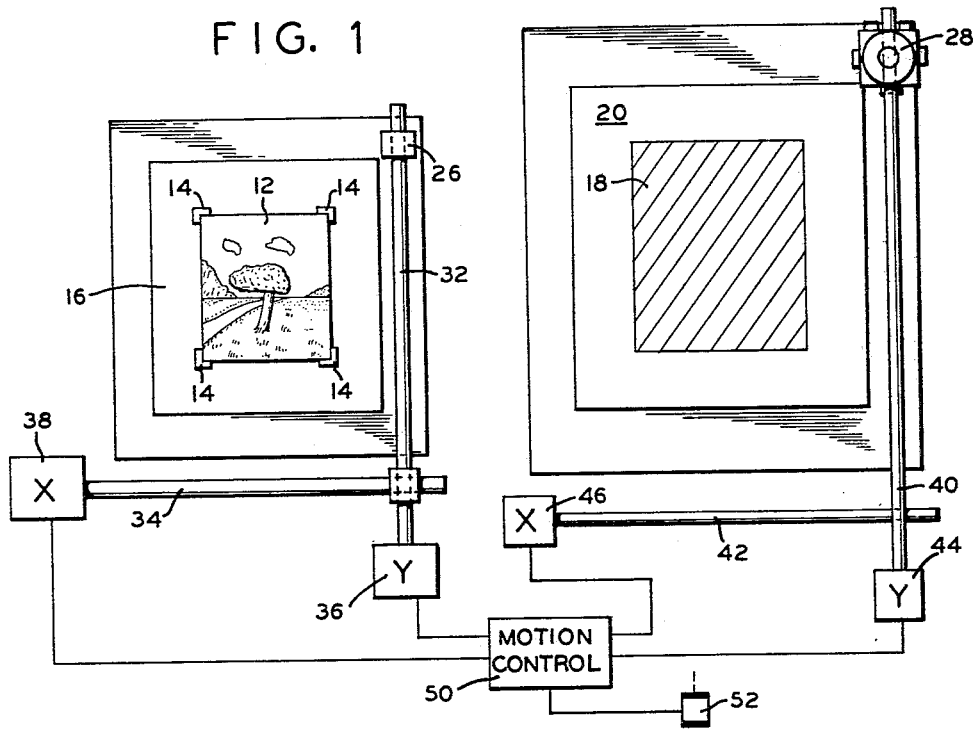
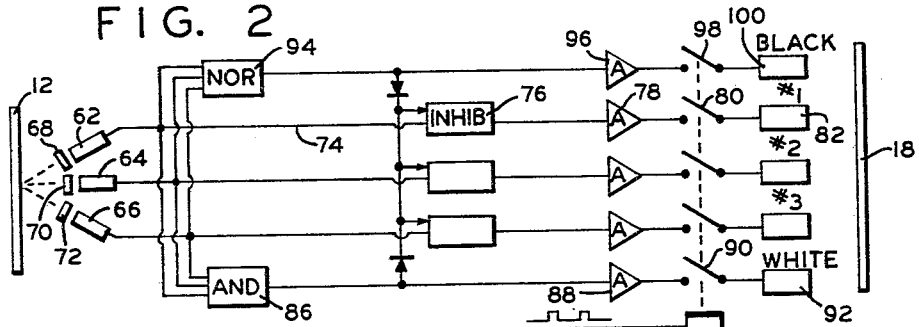
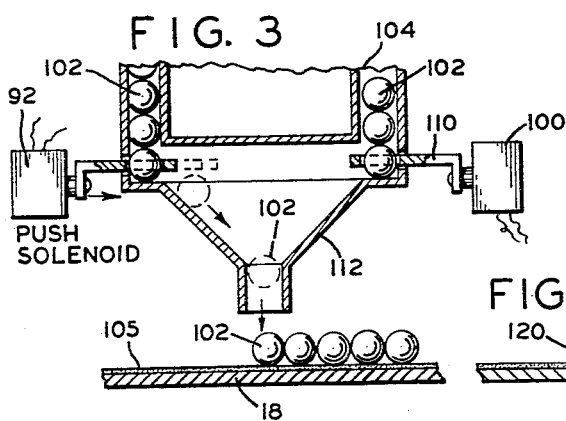
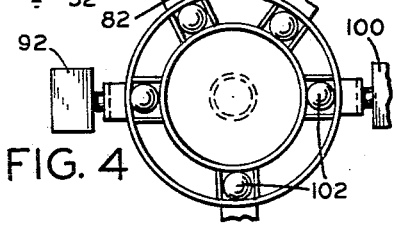
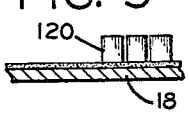
INVENTOR.
LUTHER G. SIMJIAN
BY
Ervin B. Steinberg
AGENT.

United States Patent Office 3,135,828
Patented June 2, 1964

3,135,828
APPARATUS FOR PROVIDING SOLID
REPRODUCTIONS
Luther G. Simjian, Laurel Lane, Greenwich, Conn.
Filed Apr. 20, 1962, Ser. No. 189,141
10 Claims. (Cl. 178—6.6)

This invention concerns an apparatus for providing reproduction of a subject, and more particularly, has reference to an apparatus for providing a solid reproduction of a colored subject.

The reproduction of a colored subject by depositing paint particles in conjunction with the use of electrostatic phenomena is well known in the art, such reproductions being essentially flat prints in an enlarged or reduced scale. The present invention concerns an arrangement for reproducing an object using three-dimensional particles to generate a reproduction of the mosaic type.

One of the objects of this invention, therefore, is the provision of a simple, effective and efficient apparatus for producing solid reproductions of a colored print, painting or similar graphic representation.

Another object of this invention is the provision of an apparatus for depositing three-dimensional particles onto a coated sheet, the deposit of particles being responsive to the operation of scanning means.

A further object of this invention is the provision of an apparatus for producing solid color reproductions of colored prints, paintings and graphic representations by depositing three-dimensional colored particles onto a base sheet.

Further and still other objects of this invention will be apparent by reference of the following description when taken in conjunction with the accompanying drawings in which:

FIGURE 1 is a schematic plan view of the mechanical portions of the apparatus;

FIGURE 2 is a schematic electrical circuit diagram;

FIGURE 3 is an elevational view, partly in section, of the lower portion of the dispensing means;

FIGURE 4 is a top-plan view of the dispensing means,

And FIGURE 5 is a view showing the depositing of three-dimensional particles of an alternative shape.

Referring now to the figures and FIGURE 1 in particular, numeral 12 refers to a subject such as a color print or painting which is to be reproduced. This subject is retained by means of corner pieces 14 on a base plate and frame 16. Numeral 18 refers to a base sheet upon which the solid reproduction of subject 12 is to be effected, and this base sheet 18 is temporarily fastened by suitable means upon a frame 20. Associated with base plate 16 and graphic representation 12, there is a scanning means or head 26, and associated with base sheet 18 and frame 20, there is a corresponding reproducing means or head 28 which includes particle storage and dispensing means.

Scanning means 26 is adapted to move above subject 12 by means of a conventional X-Y drive using a set of longitudinal screw members 32 and 34, each such member being driven by an associated motor 36 and 38. Similarly, reproducing means 28 is adapted to move in concomitant motion with the scanning means relative to base sheet 18 by means of members 40, 42 and associated motors 44 and 46. The provision of synchronized drives along mutually perpendicular axes is well known in the art, and it will be apparent to those skilled in the art, that any suitable mechanical arrangement may be used to accomplish synchronized motion between the scanning means and the reproducing means. Also, by suitable gear ratios such motion can appear amplified or decreased at the reproducing means, thus providing either enlargements or miniature reproductions of the subject.

In the instant disclosure, a control means 50 provides motion of the scanning means and reproducing means in line-by-line fashion with the line spacing being arranged so as to substantially coincide with the particle size used in reproducing means 28 as will become apparent. Motors 36, 38, 44 and 46 in one typical embodiment comprise step motors to operate in step-by-step increments under the control of motion control means 50, each line being scanned along its different points with the next line being scanned in a similar manner. In this way, scanning means 26 and reproducing means 28 move in a pattern which is similar to the scanning raster in conventional television sets, omitting however, any interlace feature. The motion control means 50 provides a periodic pulse signal to relay 52 which establishes electrical connections for governing the deposit of particles onto base sheet 18.

FIGURE 2 shows the electrical circuit employed and depicts a subject 12 which is being scanned point-by-point by a plurality of photoelectric means 62, 64, 66, each having an associated optical filter 68, 70 and 72. Thus, each photoelectric means produces a signal which is responsive to a particular color. It is apparent that depending upon the colors present on subject 12 and the accuracy with which such reproduction is to be made, the quantity of photoelectric sensing means carried by scanning means 26 can be increased or decreased to suit the respective requirements.

If filter 68 is of red color and red color is present on subject 12, photoelectric sensing means 62 provides along conductor 74 a signal which denotes red color and such signal is received serially by an inhibitor circuit 76, amplifier 78, and transmitted via switch contact 80 of relay 52 to solenoid 82 which forms a part of the reproducing means 28 to effect the release of red colored three-dimensional particles onto base sheet 18. In this manner, whenever a red colored print is sensed, solenoid 82 is actuated by an electrical signal from the sensing means to cause dispensing of a red particle. A similar condition prevails with regard to photoelectric sensing means 64 and 66, the associated series connected circuit components and dispensing solenoids.

Since an object of the present invention is to deposit three-dimensional preshaped particles which are solid bodies, special provisions must be made to sense the conditions of black and white. Unlike the process when applying paint particles and overprinting of several colors is possible, conditions of white and black require the dispensing of respective colored particles. The presence of white colors is sensed by a signal at each of the sensing means 62, 64 and 66, thus providing a signal in the respective conductors. These conductors are interconnected, however, to an AND circuit 86 which via amplifier 88 and switch contact 90 can be connected to a dispensing solenoid 92 for dispensing white colored particles. The absence of color is established by the absence of a signal in any of the conductors from the photoelectric sensing means and this absence of signals is sensed by a NOR circuit 94 which is connected via amplifier 96 and circuit switch 98 to a dispensing head 100 for dispensing black colored three-dimensional particles. An inhibitor circuit 76, one being found in each conductor from the color sensing means, prevents a signal to reach the series connected amplifiers in the event that AND circuit 86 or NOR circuit 94 are operated by virtue of the simultaneous presence or absence respectively of a signal in the conductors from the color sensing means.

It will be understood, therefore, that there is a storage and dispensing means associated with each color responsive signal and that in the absence of a color signal, a black particle is dispensed while when a signal is present in all individual color responsive conductors, the dispensing of colored particles is inhibited and instead thereof, a white three-dimensional particle is dispensed onto the base sheet. Relay 52 receives a pulse signal, the occurrence of the pulses being timed to occur whenever the reproducing means has moved by an amount substantially equal to the width of the three-dimensional particles to be dispensed. When relay 52 closes its contacts, a particle is dispensed and subsequently, the X-Y drive advances the respective means by another increment along its travel across the surface of the subject and base sheet respectively and the above described process is repeated.

FIGURES 3 and 4 illustrate the dispensing means 28 in greater detail. Solid preshaped particles 102 associated with a certain color are contained in respective vertical tubes 104, there being one or more tubes for each color, and the various tubes are arranged in a generally circular pattern. The individual particles may be of round configuration as shown and made of plastics or a substance similar to marble. At the lower end of each storage tube there is disposed a solenoid for causing dispensing of a respective particle, one at a time. The solenoids, for instance 92 and 100 in FIGURE 3, are those which are connected in the electrical circluit shown in FIGURE 2. Each solenoid has attached thereto a movable bracket 110 which is provided with a suitable opening into which a particle falls by means of gravity. When relay 52 is actuated and in a typical example solenoid 100 is energized, bracket 110 advances slightly toward the center of the funnel shaped exit portion 112, the particle falls through the opening at the exit of the funnel and attaches itself to an adhesive layer 105 with which base sheet 18 has been covered. In this way, each vertical tube has attached thereto its dispensing means to cause the dispensing of a respectively colored particle responsive to the signals from the scanning means.

FIGURE 5 shows an alternative arrangement wherein particles 120 of cube or rectangular prism shape are dispensed. It will be apparent, of course, that the particles dispensed may be of any other suitable shape.

After the entire area of base sheet 18 has been covered, the particles may be permanently attached by suitable treatment and in the event of plastic parts, baking and curing may be used. Alternatively, various quick setting cements, such as plaster of Paris, may be used to obtain bonding between the individual particles and base surface. Still further, the finished mosaic may be inserted into a frame for providing a permanent support.

It will be apparent to those skilled in the art that instead of moving the sensing means and reproducing means relative to the subject and base sheet respectively, the motion may be reversed so that the subject and base sheet move relative to scanning means and reproducing means. Additionally, instead of motion in a horizontal or vertical plane, both the subject and base sheet can readily be mounted on cylindrical surfaces and scanning and deposit of particles is accomplished by stationary heads or heads moving along a single axis. If the particles deposited are of a sufficiently small size, scanning and deposit can be accomplished also in a helical or spiral pattern.

While there has been described and illustrated a certain preferred embodiment of the present invention and certain modifications thereof, it will be apparent to those skilled in the art that various further changes may be made therein without deviating from the principle and intent of the present invention which shall be limited only by the scope of the appended claims.

What is claimed is:

1. In an apparatus for providing on a base sheet a solid reproduction of a subject, the combination of:
   means for scanning the subject along successive scanning lines;
   means for translating varying tones of color at different points along each scanning line into distinct signals responsive to color;
   a reproducing means adapted to be positioned relative to the base sheet along corresponding points along respective scanning lines and receiving said distinct signals;
   said reproducing means including a plurality of storage and dispensing means, each containing solid preshaped particles of a color commensurate with the signals from the translating means,
   and means causing in response to the signals from the translating means, successive dispensing of a respective solid particle from the reproducing means onto said base sheet.

2. In an apparatus for providing on a base sheet solid reproduction of a subject, the combination of:
   means for scanning the subject along successive scanning lines;
   translating means associated with the scanning means for translating varying tones of color at different points along each scanning line into distinct signals responsive to color;
   a reproducing means adapted to be positioned relative to the base sheet along corresponding points along respective scanning lines and receiving said distinct signals;
   said reproducing means including a plurality of storage and dispensing means, each containing solid preshaped particles of a color commensurate with the signals from the translating means;
   means causing in response to the signals from the translating means, successive dispensing of a respective solid particle from the reproducing means onto said base sheet,
   and means for causing concomitant motion between said scanning means and subject, and reproducing means and base sheet respectively.

3. In an apparatus for providing on a base sheet a solid reproduction of a subject, the combination of:
   a scanning means for scanning the subject along successive scanning lines;
   electrical translating means associated with the scanning means for translating varying tones of color at different points along each scanning line into distinct electrical signals responsive to color;
   a reproducing means adapted to be positioned relative to the base sheet along corresponding points along respective scanning lines and receiving said electrical signals;
   said reproducing means including a plurality of storage and selectively operable dispensing means for dispensing solid preshaped particles of a color commensurate with the signals from the translating means;
   means cyclically causing in response to the signals from the translating means, successive dispensing of respective solid particles from the reproducing means onto said base sheet,
   and means for causing concomitant motion between said scanning means and subject, and reproducing means and base sheet respectively.

4. In an apparatus as set forth in claim 3 wherein said base sheet is provided with means for retaining the particles dispensed thereupon.

5. In an apparatus for providing on a base sheet a solid reproduction of a subject, the combination of:
   a scanning means for scanning the subject along successive scanning lines;
   electrical translating means associated with the scanning means for translating varying tones of color at different points along each scanning line into distinct electrical signals responsive to color;
   a reproducing means adapted to be positioned relative to the base sheet along corresponding points along respective scanning lines and receiving said electrical signals from said translating means;
   said reproducing means including a plurality of storage and selectively operable dispensing means for dispensing solid preshaped particles of a color commensurate with the signals from the translating means and such storage and dispensing means including particles of white and black color respectively;

means cyclically causing in response to the signals from the translating means, successive dispensing of respective solid particles from the reproducing means onto said base sheet;

means for causing concomitant motion between said scanning means and subject, and reproducing means and base sheet respectively, and said translating means causing dispensing of a white colored particle when the translating means sense the presence of a plurality of colors and dispense black particles in the absence of color at a particular point along the subject.

6. In an apparatus for providing on a base sheet a solid reproduction of a subject, the combination of:

an optical scanning means which includes color filters for scanning the subject along successive scanning lines;

electrical translating means connected to the scanning means for translating varying colors at different points along each scanning line into distinct electrical signals responsive to color;

a reproducing means adapted to be positioned relatively to the base sheet along corresponding points along respective scanning lines;

said reproducing means including a plurality of storage tubes, each tube containing a supply of solid preshaped particles of a certain color;

dispensing means associated with each tube for causing the release of a respective colored particle onto the base sheet in response to a corresponding signal from the translating means;

means causing concomitant motion between said scanning means and subject, and reproducing means and base sheet respectively, and control means for causing cyclical dispensing of a particle when the reproducing means and base sheet are displaced incrementally by approximately the width of one particle.

7. In an apparatus as set forth in claim 6 wherein said reproducing means is moved relative to the base sheet.

8. In an apparatus as set forth in claim 6 wherein said means causing concomitant motion comprise drive means causing motion along two perpendicular axes.

9. In an apparatus for providing on a base sheet a solid reproduction of a subject, the combination of:

means for scanning the subject along a predetermined pattern;

means for translating varying tones of color at different points along said pattern into distinct signals responsive to color;

a reproducing means adapted to be positioned relative to the base sheet along corresponding points along said pattern and receiving said distinct signals;

said reproducing means including storage and dispensing means for storing and dispensing solid preshaped particles;

and control means causing in response to said signals from said translating means said dispensing means to dispense said solid preshaped particles onto said base sheet.

10. In an apparatus as set forth in claim 9 wherein said storing and dispensing means holds and dispenses particles of substantially uniform size.

References Cited in the file of this patent
UNITED STATES PATENTS

| | | |
|---|---|---|
| 1,817,098 | Ranger | Aug. 4, 1931 |
| 2,006,999 | Nachumsohn | July 2, 1935 |
| 2,278,940 | Murphy | Apr. 7, 1942 |